United States Patent [19]

Hiraiwa

[11] Patent Number: 5,083,478

[45] Date of Patent: Jan. 28, 1992

[54] FOUR-WHEEL VEHICLE DRIVE SYSTEM

[75] Inventor: Kazuyoshi Hiraiwa, Atsugi, Japan

[73] Assignee: Nissan Motor Company, Limited, Japan

[21] Appl. No.: 400,482

[22] Filed: Jul. 21, 1982

[30] Foreign Application Priority Data

Aug. 20, 1981 [JP] Japan .................. 56-130480

[51] Int. Cl.⁵ .............................................. F16H 37/08
[52] U.S. Cl. ................................... 180/247; 180/248; 180/250
[58] Field of Search ............. 74/694, 710.5, 665 G, 74/665 GC; 180/247, 248, 249, 250, 297

[56] References Cited

U.S. PATENT DOCUMENTS

| | | | |
|---|---|---|---|
| 2,158,320 | 5/1939 | Bock | 74/326 |
| 2,400,777 | 9/1968 | Hill | 180/44 |
| 4,299,140 | 11/1981 | Kaka et al. | 74/665 GC X |
| 4,367,661 | 1/1983 | Moroto et al. | 74/665 G X |
| 4,415,058 | 11/1983 | Suzuki | 180/297 X |
| 4,417,642 | 11/1983 | Suzuki et al. | 180/249 |
| 4,420,059 | 12/1983 | Suzuki | 180/297 X |
| 4,428,452 | 1/1984 | Muraoka | 74/710.5 X |
| 4,431,079 | 2/1984 | Suzuki | 180/233 |
| 4,441,575 | 4/1984 | Suzuki | 180/248 |
| 4,449,604 | 5/1984 | Suzuki | 180/233 |
| 4,457,394 | 7/1984 | Suzuki | 180/247 |
| 4,459,874 | 7/1984 | Suzuki | 74/745 |
| 4,476,953 | 10/1984 | Hiraiwa | 180/249 |

FOREIGN PATENT DOCUMENTS

| | | | |
|---|---|---|---|
| 2252050 | 2/1980 | Fed. Rep. of Germany . | |
| 881038 | 4/1943 | France | 74/694 |
| 52-7534 | 1/1977 | Japan . | |
| 54-151230 | 11/1979 | Japan . | |
| 55-11948 | 1/1980 | Japan . | |
| 55-17727 | 2/1980 | Japan . | |
| 55-25639 | 2/1980 | Japan . | |
| 55-170129 | 12/1980 | Japan . | |
| 2057987 | 4/1981 | United Kingdom | 180/248 |
| 2064449 | 6/1981 | United Kingdom | 180/248 |

Primary Examiner—Lawrence J. Staab
Assistant Examiner—Dwight G. Diehl
Attorney, Agent, or Firm—Lane and Aitken

[57] ABSTRACT

A four-wheel vehicle drive system, comprising an engine having an output shaft in a lateral direction of the vehicle, a power transmission gear unit including transmission input and output shafts having axes of rotation parallel with the engine output shaft, a final reduction gear rotatable about an axis parallel with the transmission input and output shafts, the transmission output shaft being in driving engagement with the final reduction gear, a gear housing rotatable with the final reduction gear, a main transaxle casing having enclosed therein the transmission gear unit, final reduction gear and gear housing, an auxiliary transaxle casing secured to the main transaxle casing, a first wheel drive gear unit to split driving power from the final reduction gear into two components and including a differential gear assembly enclosed in the auxiliary transaxle casing and operative to transmit one of the power components to a pair of road wheels, a second wheel drive gear unit enclosed in the auxiliary transaxle casing and operative to transmit therethrough the other of the two driving power components in a fore-and-aft direction of the vehicle to drive another pair of road wheels, and low-and-high speed shifting means including a shift gear assembly enclosed within the gear housing and operative to transfer driving power from the final reduction gear to the differential gear assembly selectively with two different gear ratios.

12 Claims, 2 Drawing Sheets

FOUR-WHEEL VEHICLE DRIVE SYSTEM

FIELD OF THE INVENTION

The present invention relates to a four-wheel drive system for an automotive vehicle having at least two pairs of road wheels consisting of a pair of front road wheels and a pair of rear road wheels and, more particularly, to a transaxle mechanism for use in a four-wheel drive system for such a wheeled vehicle.

DESCRIPTION OF THE PRIOR ART

In an automotive vehicle equipped with a four-wheel drive system, it is desired to provide not only clutch and transmission gear units but low-and-high speed shifting means adapted to transfer the power output of the transmission gear unit selectively with two different input-/output gear ratios therethrough so as to enable the drive system to drive the front and rear road wheels with torques adequate for various operational and road conditions. Whereas, a four-wheel drive system is known which is of the type using a power plant positioned to have an axis of rotation in a lateral direction of the vehicle body. Typical examples of such a four-wheel drive system are disclosed in, for example, Japanese Provisional Publications of Patent No. 55-11948 and No. 55-17727. The prior-art four-wheel drive system therein shown is, however, not provided with the low-and-high speed shifting means of the above described nature. If a transaxle mechanism originally designed to form part of a two-wheel drive system is to be modified to construct a transaxle mechanism for a four-wheel drive system having low-and-high speed shifting means, it is required to have the low-and-high speed shifting means positioned between the laterally positioned power plant and a front-wheel differential gear assembly forming part of the transaxle mechanism. For this purpose, drastic modification is required of the construction and arrangement of the transaxle mechanism for the two-wheel drive system.

In an effort to provide enhanced compatibility between a transaxle mechanism for a two-wheel drive system and that for a four-wheel drive system, a transaxle mechanism for use with a laterally positioned internal combustion engine has been proposed which features low-and-high speed shifting means provided between the clutch and transmission gear units of the transaxle mechanism. An example of a four-wheel drive system using such a transaxle mechanism is taught in Japanese Provisional Publication of Utility Model No. 55-170129. Considerable design modifications and production costs therefor are, however, still required for re-constructing a transaxle mechanism for a two-wheel drive system into a transaxle mechanism for a four-wheel drive system.

The present invention contemplates elimination of these drawbacks of known four-wheel drive systems of the described characters. It is, accordingly, a prime object of the present invention to provide a four-wheel drive system including a transaxle mechanism which has low-and-high speed shifting means incorporated therein and which can be constructed by slightly modifying a transaxle mechanism originally designed for use in a two-wheel drive system of an automotive vehicle.

SUMMARY OF THE INVENTION

In accordance with the present invention, there is provided a four-wheel drive system for a vehicle with first and second pairs of road wheels, comprising a power unit having an output shaft rotatable about an axis in a lateral direction of the vehicle; a power transmission gear unit including transmission input and output shafts each having an axis of rotation parallel with an extension of the axis of rotation of the output shaft of the power unit; a final reduction gear rotatable about an axis parallel with the respective axes of rotation of the transmission input and output shafts, the transmission output shaft being held in driving engagement with the final reduction gear; a gear housing rotatable with the final reduction gear about the axis of rotation of the final reduction gear; a main transaxle gear casing having enclosed therein the transmission gear unit, the final reduction gear and the gear housing; an auxiliary transaxle gear casing secured to the main transaxle gear casing; a first wheel drive gear unit comprising power splitting gear means operative to split driving power from the final reduction gear into two power components and a differential gear assembly operative to transmit one of the two power components to the first pair of road wheels, the power splitting means and the differential gear assembly being enclosed within the auxiliary transaxle gear casing; a second wheel drive gear unit enclosed within the auxiliary transaxle gear casing and operative to transmit therethrough the other of the two driving power components in a fore-and-aft direction of the vehicle, the power splitting gear means operatively intervening between the final reduction gear and the second wheel drive gear unit; and low-and-high speed shifting means operative to transfer driving power from the final reduction gear to the differential gear assembly selectively with two different gear ratios, the low-and-high speed shifting means including a low-and-high speed shift gear assembly enclosed within the gear housing. In the transaxle mechanism thus constructed and arranged, the differential gear assembly of the first wheel drive gear unit preferably comprises a pair of rotatable output members which have respective axes of rotation substantially aligned with each other and through which one of the aforesaid two power components is to be transmitted to the first pair of road wheels, the low-and-high speed shift gear assembly comprising power input and output members rotatable about a common axis substantially aligned with the axis of rotation of the output members of the differential gear assembly, the power input member of the low-and-high speed shift gear assembly being rotatable with the final reduction gear. More specifically, the differential gear assembly of the first wheel drive gear unit may comprise a rotatable input member and a pair of rotatable output members which have respective axes of rotation substantially aligned with each other and through which one of the aforesaid two power components is to be transmitted to the first pair of road wheels, the low-and-high speed shifting means comprising a constant power input member rotatable with the final reduction gear, a constant power output member rotatable with the input member of the differential gear assembly and a lockable output member engageable with the auxiliary transaxle gear casing, the input and output members of the low-and-high speed shift gear assembly being rotatable about a common axis substantially aligned with the axis of rotation of the output members of the differential gear assembly.

DESCRIPTION OF THE DRAWINGS

The features and advantages of a transaxle mechanism of a four-wheel drive system proposed by the present invention will be more clearly understood from the following description take in conjunction with the accompanying drawings in which.

DESCRIPTION OF THE PREFERRED EMBODIMENT

Figure 1:
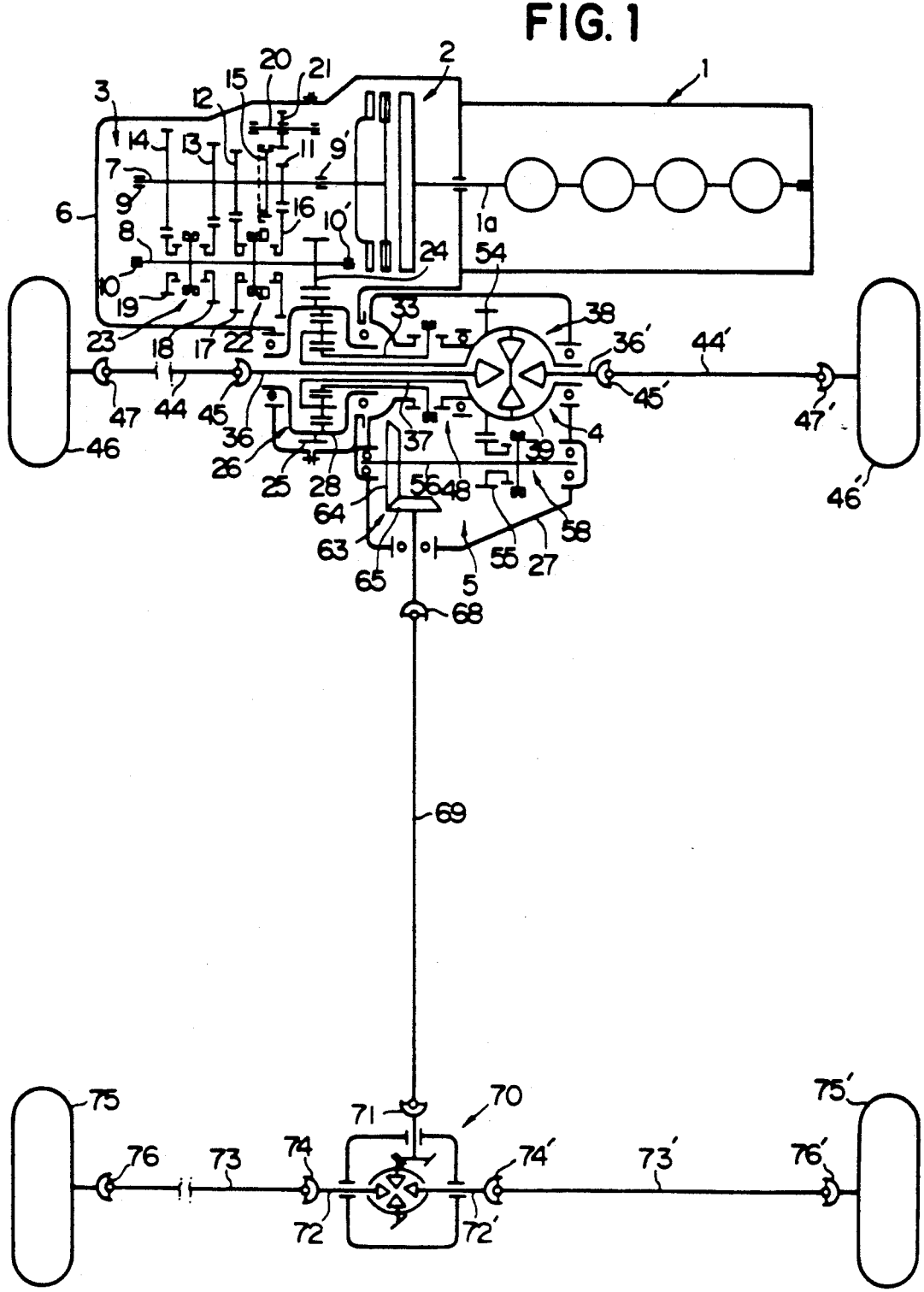
FIG. 1 is a schematic plan view showing a preferred embodiment of a four-wheel drive system according to the present invention.

Referring to the drawings, a four-wheel drive system according to the present invention comprises a transaxle mechanism in combination with a power unit typically constituted by an internal combustion engine which is schematically indicated at 1 in FIG. 1. The internal combustion engine 1 has a power output shaft 1a which is constituted by, for example, the crankshaft of an ordinary internal combustion engine for automotive use. The transaxle mechanism of the four-wheel drive system proposed by the present invention is to be used in a vehicle having the engine positioned laterally of the vehicle body. The engine 1 is thus installed on the body structure (not shown) of a wheeled vehicle in such manner that the output shaft 1a extends in a lateral direction of the vehicle body. The transaxle mechanism of the system embodying the present invention is further assumed as being incorporated in an automotive vehicle of the front-engine design and, thus, the engine 1 is positioned in a front portion of the vehicle body. As is further shown in FIG. 1 of the drawings, the transaxle mechanism for use in such a four-wheel drive system includes a clutch unit 2, and a power transmission gear unit 3. In the embodiment of the present invention as herein shown, it is assumed by way of example that the clutch unit 2 is of the mechanical friction-disc type and that the power transmission gear unit 3 is of the manually operated synchromesh type. The transaxle mechanism of the system embodying the present invention comprises, in addition to the transmission gear unit 3, a front-wheel drive gear unit 4 and a rear-wheel drive gear unit 5 which are enclosed together with the transmission gear unit 3 within a transaxle casing structure fixedly mounted on the vehicle body.

The power transmission gear unit 3 is enclosed within a main transaxle gear casing 6 forming part of the above mentioned transaxle casing structure and comprises input and output shafts 7 and 8. The input shaft 7 has opposite end portions respectively journaled in bearings 9 and 9' received in the transaxle gear casing 6 and extends in alignment with the axis of rotation of the engine output shaft 1a. The transmission output shaft 8 likewise has opposite end portions respectively journaled in bearings 10 and 10' received in the transaxle gear casing 6 and extends in parallel with the transmission input shaft 7. The transmission input shaft 7 is selectively coupled to and uncoupled from the engine output shaft 1a through the clutch unit 2. The transmission gear unit 3 is assumed to be of the four-forward-speed and one-reverse-speed type and thus comprises five input gears rotatable with the transmission input shaft 7 and consisting of first-speed to fourth-speed forward drive gears 11 to 14, and a reverse drive gear 15. On the other hand, the transmission output shaft 8 has mounted thereon four driven gears rotatable independently of one another on the shaft 8 and consisting of first-speed to fourth-speed driven gears 16 to 19. The gears 16 to 19 are held in mesh with the drive gears 11 to 14, respectively, on the transmission input shaft 7. The transmission gear unit 3 further comprises a reverse idler shaft 20 having an idler gear 21 rotatable and axially slidable thereon and movable on the shaft 20 into and out of an axial position held in mesh with the reverse drive gear 15 on the transmission input shaft 7 as indicated by broken lines in FIG. 1. The reverse idler shaft 20 also extends in parallel with the transmission input shaft 7 and has opposite end portions secured to the main transaxle gear casing 6.

The transmission gear unit 3 further comprises first-second and third-fourth speed synchronizer clutch assemblies 22 and 23, each of which is rotatable with the transmission output shaft 8. The first-second speed synchronizer clutch assembly 22 is provided between the first-speed and second-speed driven gears 16 and 17 and is selectively engageable with these gears 16 and 17. Likewise, the third-fourth speed synchronizer clutch assembly 23 is provided between the third-speed and fourth-speed driven gears 18 and 19 and is selectively engageable with the gears 18 and 19. The transmission output shaft 8 has fixedly mounted thereon a transmission output gear 24 which is thus rotatable with the transmission output shaft 8. The transmission output gear 24 is held in mesh with an annular final reduction gear 25 also enclosed within the main transaxle gear casing 6 and rotatable with respect to the gear casing 6 about an axis parallel with the axis of rotation of the transmission output shaft 8.

Figure 2:
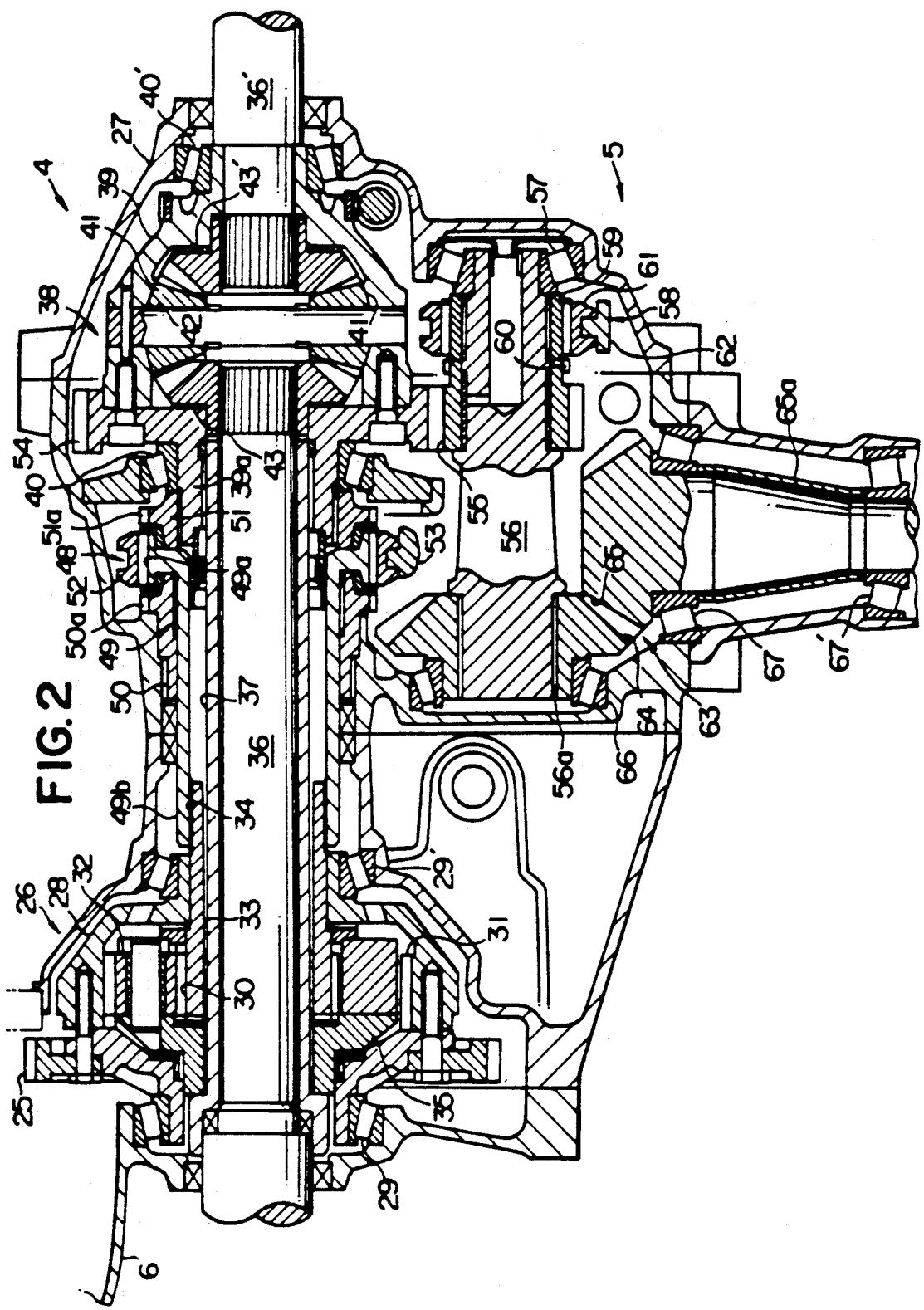
FIG. 2 is a sectional view of the transaxle mechanism forming part of the four-wheel drive system shown in FIG. 1.

As will be better seen from FIG. 2 of the drawings, the main transaxle gear casing 6 has further enclosed therein a low-and-high speed shift gear assembly 26 as well as the above described clutch unit 2, transmission gear unit 3 and the final reduction gear 25 and is securely connected to an auxiliary transaxle gear casing 27. The low-and-high speed shift gear assembly 26 forms part of low-and-high speed shifting means in the transaxle mechanism of the four-wheel drive system according to the present invention. In the shown embodiment of the present invention, the low-and-high speed shift gear assembly 26 is operative to selectively produce two input/output gear ratios and is constituted by a planetary gear assembly which comprises a hollow gear housing 28 which is integral with the above mentioned final reduction gear 25 and which has opposite axial boss portions respectively journaled in bearings 29 and 29' received in the auxiliary transaxle gear casing 27. The gear housing 28 is thus rotatable with the final reduction gear 25 about the axis of rotation of the gear 25 with respect to the auxiliary transaxle gear casing 27. The planetary gear assembly further comprises an externally toothed sun gear 30, an internally toothed ring gear 31 and a plurality of externally toothed planet pinions 32. The sun gear 30 is constituted by an axial portion of a sleeve 33 axially passing through the gear housing 28 and having a center axis coincident with the axis of rotation of the housing 28. The sleeve 33 is rotatable with respect to the transaxle gear casing 27 and the gear housing 28 about the axis of rotation of the housing 28 and has an externally serrated axial portion 34 axially projecting outwardly from the gear housing 28 in a direction opposite to the final reduction gear 25 as shown. The ring gear 31 is constituted by an annular inner wall portion of the gear housing 28 and coaxially encircles the sun gear 30. The planet pinions 32 intervene between the sun and ring gears 30 and 31 and are held in mesh with these gears 30 and 31. The planet pinions 32 are connected together by an internally serrated pinion carrier 35 rotatable with respect to the auxiliary transaxle gear casing 27 and the gear housing 28 about an axis aligned with the common axis of rotation of the sun and ring gears 30 and 31. Each of the planet pinions 32 is, thus, rotatable not only about the center axis thereof with respect to the pinion carrier 35 but, together with the pinion carrier 35, about the common axis of rotation of the sun gear 30 and ring gear 31 with respect to the auxiliary transaxle gear casing 27 and the gear housing 28.

The front-wheel drive gear unit 4 of the four-wheel drive system embodying the present invention comprises a pair of front-wheel side gear shafts 36 and 36' having respective axes of rotation which are aligned with the axis of rotation of the final reduction gear 25 and which are thus parallel with the input and output shafts 7 and 8 of the transmission gear unit (FIG. 1). One front-wheel side gear shaft 36 has an inner axial portion rotatably received in a hollow shaft 37 axially extending in part through the sleeve 33 and having an axially outer end portion splined to the pinion carrier 35 of the planetary gear assembly. The side gear shafts 36 and 36' have serrated inner end portions and axially extend from a frontwheel differential gear assembly 38 in opposite directions laterally of the vehicle body as will be seen from FIG. 1. The front-wheel differential gear assembly 38 is also enclosed within the auxiliary transaxle gear casing 27 and comprises a gear housing 39 which is rotatable about an axis aligned with the axes of rotation of the side gear shafts 36 and 36'. The gear housing 39 has opposite axial boss portions respectively journaled in bearings 40 and 40' received in the auxiliary transaxle gear casing 27 and has carried therein a pair of differential bevel pinions 41 which are rotatably mounted on a common pinion cross shaft 42 secured to the gear housing 39 and extending at right angles to the axis of rotation of the gear housing 39. The individual bevel pinions 41 are, thus, rotatable not only together with the gear housing 39 and cross shaft 42 about the axis of rotation of the gear housing 39 but also independently of one another about the center axis of the cross shaft 42, viz., about an axis perpendicular to the axis of rotation of the gear housing 39. The differential bevel pinions 41 intervene between and are held in mesh with a pair of differential side bevel gears 43 and 43' which are also carried in the differential gear housing 39 and which are rotatable about the axis of rotation of the gear housing 39. The bevel gears 43 and 43' constitute power output members of the differential gear assembly 38 and have respective axes of rotation aligned with the common axis of rotation of the sun gear 30, ring gear 31 and pinion carrier 35 of the planetary gear assembly. The side bevel gears 43 and 43' are fixedly connected to or splined to the serrated inner end portions of the side gear shafts 36 and 36', respectively, extending in a lateral direction of the vehicle body. The front-wheel side gear shafts 36 and 36' form part of front axle assemblies and are operatively connected at their axially outer ends to front wheel drive shafts 44 and 44' through suitable coupling means such as constant-velocity or universal coupling units 45 and 45', respectively. The front wheel drive shafts 44 and 44' also extend in a lateral direction of the vehicle body and are in turn connected at their outer axial ends to the front wheel axles for front road wheels 46 and 46' via suitable coupling means such as constant-velocity or universal units 47 and 47', respectively, as shown in FIG. 1. The gear housing 39 of the differential gear assembly 38 has one of its axial boss portions formed with an externally serrated, hollow axial extension 39a splined to an internally serrated axially inner end portion of the hollow shaft 37 as shown in FIG. 2. The hollow axial extension 39a of the gear housing 39 is also externally serrated and is splined to a second clutch gear 51 which will become apparent as the description proceeds.

The low-and-high speed shifting means of the drive system embodying the present invention comprises, in addition to the above described low-and-high speed shift gear assembly 26, a low-and-high speed shift control assembly 48 enclosed within the transaxle gear casing 27 and adapted to have the low-and-high speed shift gear assembly 26 conditioned to selectively produce the two input/output gear ratios. The low-and-high speed shift control assembly 48 comprises a driving member 49 having an externally serrated annular portion 49a and a tubular extension 49b. The serrated annular portion 49a coaxially surrounds the axial portion of the hollow shaft 37 and is located axially adjacent the externally serrated axial extension 39a of the differential gear housing 39. The tubular extension 49b extends from the annular portion 49a in coaxial relationship to the hollow shaft 37 and has an internally serrated end portion splined to the previously mentioned externally serrated peripheral portion 34 of the sleeve 33. The driving member 49 is thus rotatable with the final reduction gear 25 about the axis of rotation of the side gear shaft 36 and has its tubular extension 49b rotatably received in inner wall portions of the auxiliary transaxle gear casing 27. The low-and-high speed shift control assembly 48 further comprises first and second clutch gears 50 and 51 disposed also in coaxial relationship to the hollow shaft 37 and in such a manner that the annular portion 49a of the driving member 49 axially intervenes therebetween. The second clutch gear 51 is internally serrated and is splined to the previously mentioned externally serrated axial extension 39a of the differential gear housing 39. Furthermore, the second clutch gear 51 has an externally serrated annular portion 51a axially adjacent one end face of the serrated annular portion 49a of the driving member 49. On the other hand, the first clutch gear 50 is securely connected to the auxiliary transaxle gear casing 27 and has an externally serrated annular portion 50a axially adjacent the other end face of the serrated annular portion 49a of the driving member 49. The externally serrated annular portion 49a of the driving member 49 is splined to an internally serrated, annular coupling sleeve 52. The coupling sleeve 52 is axially movable on the externally serrated annular portion 49a of the driving member 49 selectively into engagement with the externally serrated annular portion 50a of the first clutch gear 50 or the externally serrated annular portion 51a of the second clutch gear 51. The coupling sleeve 52 is formed with an external circumferential groove having fitted therein a clutch actuating fork 53. Though not shown in the drawings, the clutch actuating fork 53 is connected through a suitable mechanical linkage to manually or otherwise operated low-and-high speed shift control means so that the coupling sleeve 52 is axially moved selectively into engagement with the first or second clutch gear 50 or 51. The sun gear 30 of the planetary gear assembly constituting the previously described low-and-high speed shift gear assembly 26 is thus connected to and rotatable with the driving member 49 of the above described low-and-high speed shift control assembly 48 through the sleeve 33, while the pinion carrier 35 of the planetary gear assembly is connected to and rotatable with the second clutch gear 51 of the low-and-high speed shift control assembly 48 through the hollow shaft 37 and the gear housing 39 of the front-wheel differential gear assembly 38.

The front-wheel drive gear unit 4 further comprises power splitting gear means enclosed within the auxiliary transaxle gear casing 27 and operative to split driving power from the low-and-high speed shift control assembly 48 into two driving power components one of which is to be transmitted to the front-wheel differential gear assembly 38 and the other of which is to be transmitted to the rear-wheel drive gear unit 5. In the shown embodiment of a four-wheel drive system according to the present invention, such power splitting gear means comprises a first power transfer gear 54 which is constituted by a portion of or otherwise coaxially rotatable with the differential gear housing 39, and a second power transfer gear 55 which is coaxially rotatable on a power transfer gear shaft 56 and which is held in mesh with the first power transfer gear 54. The power transfer gear shaft 56 is rotatable about an axis parallel with the side gear shaft 36 and has an axial end portion journaled in a bearing 57 received in the transaxle gear casing 27 and an externally serrated opposite axial end portion 56a.

On the other hand, the rear-wheel drive gear unit 5 is also enclosed within the auxiliary transaxle gear casing 27 and comprises a two-wheel/four-wheel drive shift gear assembly 58 adapted to selectively establish or cut off driving connection from the first power transfer gear 54 to the rear-wheel driveline. In the system embodying the present invention, such a two-wheel/four-wheel drive shifting gear assembly 58 comprises at least three clutch members consisting of a first clutch member held in driving connection to the rear wheel driveline and rotatable with, for example, the power transfer shaft 56, a second clutch member rotatable with the second power transfer gear 55, and a third clutch member rotatable with the first clutch member and selectively movable into and out of engagement with the first and second clutch members. In the embodiment herein shown, the first clutch member is constituted by an externally serrated annular clutch member 59 mounted on or splined to an axial end portion of the power transfer shaft 56 and thus coaxially rotatable with the shaft 56. On the other hand, the second clutch member is constituted by a clutch gear 60 coaxially rotatable on the power transfer shaft 56 and integral or otherwise rotatable with the second power transfer gear 55. The clutch gear 60 has an externally serrated annular portion located axially adjacent the clutch member 59. The two-wheel/four-wheel drive shifting gear assembly 58 further comprises an internally serrated, annular coupling sleeve 61 which is splined to the clutch member 59. The coupling sleeve 61 constitutes the above mentioned third clutch member. The coupling sleeve 61 is formed with an external circumferential groove having fitted therein a clutch actuating fork 62. Though not shown in the drawings, the clutch actuating fork 62 is connected through a suitable mechanical linkage to manually or otherwise operated two-wheel/four-wheel drive shift control means so that the coupling sleeve 61 is axially moved selectively into engagement with the clutch gear 60.

The rear-wheel drive gear unit 5 further comprises a right-angle power transfer gear assembly 63 operatively connected through a rear wheel driveline to the wheel axles for rear road wheels. The right-angle power transfer gear assembly 63 consists of a driving bevel gear 64 and a driven bevel gear 65. The driving bevel gear 64 has a boss portion journaled in a bearing 66 received in the auxiliary transaxle gear casing 27 and is splined to the serrated axial end portion 56a of the power transfer shaft 56 and is thus coaxially rotatable with the power transfer shaft 56. The driven bevel gear 65 is held in mesh with the driving bevel gear 64 and is rotatable about an axis perpendicular to the axis of rotation of the power transfer shaft 56. The driven bevel gear 65 has a rearward axial extension 65a journaled in bearings 67 and 67' received in the auxiliary transaxle gear casing 27. The axial extension 65a of the driven bevel gear 65 projects rearwardly from the gear casing 27 through an opening formed therein as shown in FIG. 2 and is connected through a suitable joint unit such as a constant-velocity or universal coupling unit 68 to a propeller shaft 69 extending rearwardly from the gear 65 in a fore-and-aft direction of the vehicle body as shown in FIG. 1. The propeller shaft 69 forms part of the rear wheel driveline and is connected at its rear end to a rear-wheel final reduction and differential gear assembly 70 through a constant-velocity or universal coupling unit 71. The rear-wheel final reduction and differential gear assembly 70 has a power input member connected to the propeller shaft 69 through the coupling unit 71 and a pair of power output members connected to side gear shafts 72 and 72', respectively, and is adapted to produce between the input member and each of the output members a gear ration equal to that achieved in the differential gear assembly 38 of the front-wheel drive gear unit 4. The side gear shafts 72 and 72' axially extend in a lateral direction of the vehicle body from the gear assembly 70 similarly to the front-wheel side gear shafts 36 and 36'. These side gear shafts 72 and 72' are connected at their axially outer ends to rear wheel drive shafts 73 and 73' through constant-velocity or universal coupling units 74 and 74', respectively. The rear-wheel drive shafts 73 and 73' also extend in a lateral direction of the vehicle body and are connected at their outer axial ends to the rear wheel axles for front road wheels 75 and 75' through constant-velocity or universal coupling units 76 and 76', respectively.

Description will now be made regarding the operation of the four-wheel drive system including the transaxle mechanism constructed and arranged as hereinbefore described.

When the engine 1 is in operation and the clutch unit 2 is in a coupled condition, the driving power delivered from the output shaft 1a of the engine 1 is transmitted through the clutch unit 2 to the input shaft 7 of the power transmission gear unit 3. If, under these conditions, one of the driven gears 16 and 19 on the transmission output shaft 8 is coupled to the shaft 8 through the associated synchronizer clutch assembly 22 or 23 or the reverse idler gear 21 is held in mesh with the reverse drive gear 15 and the synchronizer clutch assembly 22, the driving power carried to the transmission input shaft 7 is transmitted to the transmission output shaft 8 through the selected pair of gears on the shafts 7 and 8 or through the gears 15 and 21. The transmission output shaft 8 is, as a result, driven for rotation at a speed proportioned in the selected ratio to the rotational speed of the transmission input shaft 7. The rotation of the transmission output shaft 8 is transmitted via the transmission output gear 24 on the shaft 8 to the final reduction gear 25 which is held in constant mesh with the transmission output gear 24. The rotation of the final reduction gear 25 is carried through the gear housing 28 to the ring gear 31 of the planetary gear assembly constituting the low-and-high speed shift gear assembly 26 and drives the ring gear 31 for rotation about the center axis of the front-wheel side gear shaft 36. The ring gear 31 in turn drives the planet pinions 32 for rotation about the respective center axes thereof and thereby further drives the pinion carrier 35 and accordingly the hollow shaft 37 for rotation about the common axis of rotation of the sun and ring gears 30 and 31. The rotation of the hollow shaft 37 is transmitted to the gear housing 39 of the differential gear assembly 38 and causes the gear housing 39 to rotate about the aligned axes of rotation of the side gear shafts 36 and 36'.

If, in this instance, the annular coupling sleeve 52 of the low-and-high speed shift control assembly 48 is held in the axial position engaging the annular portion 50a of the first clutch gear 50 integral with the auxiliary transaxle gear casing 27, the driving member 49 is locked to the gear casing 27 by the coupling sleeve 52. Under these conditions, the sun gear 30 of the planetary gear assembly constituting the low-and-high speed shift gear assembly 26 is held stationary with respect to the transaxle gear casing 27 so that the pinion carrier 35 is driven to rotate about the common center axis of sun and ring gears 30 and 31 at a speed lower than the speed of rotation of the ring gear 31. The rotation of the ring gear 31 is transmitted through the hollow shaft 37 to the gear housing 39 of the differential gear assembly 38. The differential gear housing 39 is accordingly driven for rotation about an axis at right angles to the cross shaft 42 at a speed lower than the speed of rotation of the final reduction gear 25.

If, on the other hand, the annular coupling sleeve 52 of the low-and-high speed shift control assembly 48 is held in the axial position engaging the serrated annular portion 51a of the second clutch gear 51 integral with the differential gear housing 39, the driving member 49 rotatable with the sun gear 30 is driven for rotation with the second clutch gear 51 and accordingly with the hollow shaft 37 rotating with the pinion carrier 35 of the shift gear assembly 26. Under these conditions, the sun gear 30, ring gear 31 and pinion carrier 35 are caused to turn as a single unit about the common axis of rotation of the sun and ring gears 30 and 31 by the final reduction gear 25. Accordingly, the driving power transmitted from the final reduction gear 25 to the low-and-high speed shift gear assembly 26 is transmitted to the gear housing 39 of the differential gear assembly 38 through the sleeve 33, driving member 49, coupling sleeve 52 and second clutch gear 51 as well as the hollow shaft 37. The gear housing 39 of the differential gear assembly 38 is thus driven for rotation at a speed equal to the speed of rotation of the final reduction gear 25 about the axis at right angles to the cross shaft 42. Driving power is in these manners transmitted from the final reduction gear 25 to the gear housing 39 of the differential gear assembly 38 selectively at two different speeds depending upon the axial positions of the coupling sleeve 52 on the annular portion 49a of the driving member 49. As will have been understood from the foregoing description, the planetary gear assembly constituting the low-and-high speed shift gear assembly 26 in the system embodying the present invention consists essentially of a constant power input member constituted by the ring gear 31, a constant power output member constituted by the pinion carrier 35 and a lockable power output member constituted by the sun gear 30. If desired, however, such an arrangement of the planetary gear assembly may be modified as long as the planetary gear assembly comprises a constant power input member constituted by one of the sun gear 30, ring gear 31 and pinion carrier 35, a constant power output member constituted by one of the remaining two of the sun gear 30, ring gear 31 and pinion carrier 35, and a lockable power output member constituted by the remaining one of the sun gear 30, ring gear 31 and pinion carrier 35.

The driving power transmitted from the final reduction gear 25 to the gear housing 39 of the front-wheel differential gear assembly 38 is also carried not only to the bevel pinions 41 of the differential gear assembly 38 through the pinion cross shaft 42 but to the first power transfer gear 54 integral with the differential gear housing 39. In the differential gear assembly 38, the gear housing 39 drives the differential bevel pinions 41 for rotation with the housing 39 about the center axis of the pinion cross shaft 42. The differential bevel pinions 41 in turn drive the differential side bevel gears 43 and 43' for rotation with respect to the gear housing 39 about an axis at right angles to the center axis of the pinion cross shaft 42. Thus, the driving power transmitted to the differential gear assembly 38 is further split into two output components, which are transmitted to the side gear shafts 36 and 36' and further through these shafts 36 and 36', coupling units 45 and 45', front-wheel drive shafts 44 and 44' and coupling units 47 and 47' to the wheel axles of the front road wheels 46 and 46', respectively (FIG. 1).

On the other hand, the driving power transmitted to the first power transfer gear 54 of the power splitting means is carried to the second power transfer gear 55 on the power transfer gear shaft 56. If, in this instance, the coupling sleeve 61 of the two-wheel/four-wheel drive shifting gear assembly 58 is held in the axial position engaging the serrated annular portion of the clutch gear 60, the driving power imparted from the first power transfer gear 54 to the second power transfer gear 55 is transmitted through the coupling sleeve 61 and the annular clutch member 59 to the power transfer gear shaft 56 and drives the shaft 56 for rotation about the center axis thereof. The power transfer gear shaft 56 thus drives the driving bevel gear 64 of the right-angle power transfer gear assembly 63 for rotation with the power transfer gear shaft 56, and the driving bevel gear 64 in turn drives the driven bevel gear 65 for rotation about the axis thereof in a fore-and-aft direction of the vehicle body. The driving power transmitted to the driving member 49 is, thus, carried not only to the front road wheels 46 and 46' as above described but also to the rear-wheel final reduction and differential gear assembly 70 (FIG. 1) via the coupling unit 68, propeller shaft 69 and coupling unit 71. The rear-wheel final reduction and differential gear assembly 70 splits the input driving power into two driving power components respectively driving the rear-wheel side gear shafts 72 and 72'. The driving power components are further transmitted via the coupling units 74 and 74', rear-wheel drive shafts 73 and 73' and coupling units 76 and 76' to the wheel axles of the rear road wheels 75 and 75', respectively. The front road wheels 46 and 46' and the rear road wheels 75 and 75' are thus driven for rotation so that the vehicle operates in a four-wheel driven mode. If, however, the coupling sleeve 61 of the two-wheel/four-wheel drive shifting gear assembly 58 is held in the axial position disengaged from the serrated annular portion of the clutch gear 60, the clutch member 59 and accordingly the power transfer gear shaft 56 are isolated from the driving power transmitted to the second power transfer gear 55 and are allowed to idle together with the driving bevel gear 64 on the shaft 56. In this instance, only the front road wheels 46 and 46' are driven for rotation so that the vehicle operates in a two-wheel driven mode.

While the power unit in the four-wheel drive system embodying the present invention has been assumed as being positioned in a front portion of the vehicle body, the power unit of a transaxle mechanism of a four-wheel drive system according to the present invention may be installed in a lengthwise middle or rear portion of the vehicle body.

While, furthermore, the system embodying the present invention has been described as using the power transmission system of the manually-operated type, it will be apparent that a four-wheel drive system according to the present invention may be of the type which uses a power transmission system of the automatically-operated type.

One of the outstanding advantages of the four-wheel drive system proposed by the present invention as thus far described is that the low-and-high speed shift gear assembly 26 forming part of the low-and-high speed shifting means is incorporated into the gear housing 28 which is integral with the final reduction gear 25 and within which a differential gear assembly is to be installed in the case of a two-wheel driven vehicle. By virtue of such an arrangement, those members, units and assemblies required in a four-wheel driven vehicle such as, for example, the low-and-high speed shift control assembly 48, front-wheel differential gear assembly and the power splitting gears 54 and 55 can be accommodated within an additional casing constituted by the gear casing 27. In accordance with the present invention, the transaxle mechanism including low-and-high speed shifting means can thus be realized simply by modifying a transaxle mechanism for a two-wheel vehicle drive system in such a manner that the gear housing having the differential gear assembly for the two-wheel drive system is adapted to have accommodated therein the low-and-high speed shift gear assembly 26 and that the auxiliary transaxle gear casing 27 is attached additionally to the main transaxle gear casing 6. This will contribute to significant reduction of the production cost of a transaxle mechanism for use in a four-wheel drive system having a low-and-high speed shift feature as well as a two-wheel/four-wheel shift feature.

What is claimed is:

1. A four-wheel drive system for a vehicle with first and second pairs of road wheels, comprising:
   a power unit having an output shaft rotatable about an axis in a lateral direction of the vehicle;
   a power transmission gear unit including transmission input and output shafts each having an axis of rotation parallel with an extension of the axis of rotation of the output shaft of said power unit;
   a final reduction gear rotatable about an axis parallel with the respective axes of rotation of the transmission input and output shafts, the transmission output shaft being held in driving engagement with said final reduction gear;
   a gear housing rotatable with said final reduction gear about the axis of rotation of the final reduction gear and having enclosed therein a low-and-high speed shift gear assembly comprising a power input member rotatable with the gear housing, a power output member rotatable with the power input member and a lockable power output member rotatable with the power output member;
   a main transaxle gear casing having enclosed therein said transmission gear unit, said final reduction gear and said gear housing;
   an auxiliary transaxle gear casing secured to said main transaxle gear casing;
   a first wheel drive gear unit comprising power splitting gear means operative to split driving power from said final reduction gear into the two power components and a differential gear assembly operative to transmit one of the two power components to the first pair of road wheels, said power splitting gear means and said differential gear assembly being enclosed within said auxiliary transaxle gear casing;
   a second wheel drive gear unit enclosed within said auxiliary transaxle gear casing and operative to transmit therethrough the other of said power components in a fore-and-aft direction to the vehicle for transmitting the power component to the second pair of road wheels, said power splitting gear means operatively intervening between said final reduction gear and said second wheel drive gear unit; and
   low-and-high speed shifting means operative to transfer driving power from the final reduction gear to the differential gear assembly selectively with two different gear ratios, the low-and-high speed shifting means including said low-and-high speed shift gear assembly enclosed within said gear housing.

2. A four-wheel drive system as set forth in claim 1, in which the differential gear assembly of said first wheel drive gear unit comprises a pair of rotatable output members which have respective axes of rotation substantially aligned with each other and through which one of said two power components is to be transmitted to said first pair of road wheels, and in which said power input and output members of said low-and-high speed shift gear assembly are rotatable about a common axis substantially aligned with the axis of rotation of the output members of said differential gear assembly.

3. A four-wheel drive system as set forth in claim 1, in which the differential gear assembly of said first wheel drive gear unit comprises a rotatable input member and a pair of rotatable output members which have respective axes of rotation substantially aligned with each other and through which one of said power components is to be transmitted to said first pair of road wheels, said power input member of said low-and-high speed shift gear assembly being rotatable with said final reduction gear, said power output member of said low-and-high speed shift gear assembly being rotatable with the input member of said differential gear assembly, said lockable power output member of said low-and-high speed shift gear assembly being engageable with said auxiliary transaxle gear casing, the input and output members of the low-and-high speed shift gear assembly being rotatable about a common axis aligned with the axis of rotation of the output members of said differential gear assembly.

4. A four-wheel drive system as set forth in claim 3, in which the input member of said low-and-high speed shift gear assembly is held in driving engagement with the constant and lockable power output members of said low-and-high speed shift gear assembly and in which said low-and-high speed shifting means further comprises a low-and-high speed shift control assembly enclosed within said auxiliary transaxle gear casing and comprising a first clutch member rotatable with the lockable power output member of the low-and-high speed shift gear assembly, a second clutch member rotatable with the output member of the low-and-high speed shift gear assembly and with the input member of said differential gear assembly, and a coupling sleeve rotatable with the rockable output member and axially movable selectively into engagement with the first and second clutch members.

5. A four-wheel drive system as set forth in claim 4, in which said first and second clutch members are rotatable about axes commonly aligned with the axis of rotation of said final reduction gear and in which said coupling sleeve is axially movable selectively into engagement with the first and second clutch members in a direction parallel with the axes of rotation of the first and second clutch members.

6. A four-wheel drive system as set forth in claim 3, 4 or 5, in which the power input and output members of said low-and-high speed shift gear assembly form part of a planetary gear assembly which comprises a sun gear rotatable about an axis substantially aligned with the axis of rotation of said final reduction gear and constituting one of the input and output members of the low-and-high speed shift gear assembly, a ring gear rotatable about the axis of rotation of the sun gear and constituted by one of the remaining two of the input and output members of the low-and-high speed shift gear assembly, planet pinions each held in mesh with the sun gear and the ring gear and rotatable about an axis substantially parallel with the common axis of rotation of the sun and ring gears and about the common axis of rotation of the sun and ring gears, and a pinion carrier connecting said planet pinions together and rotatable about the common axis of rotation of the sun gear and the ring gear and constituted by the remaining one of the input and output members of the low-and-high speed shift gear assembly.

7. A four-wheel drive system as set forth in claim 2, 3, 4 or 5, further comprising a driveline intervening between said second wheel drive gear unit and said second pair of road wheels and adapted to be driven by the driving power component transmitted to the second wheel drive gear unit through the power splitting gear means, said second wheel drive gear unit comprising right-angle power transfer means intervening between said power splitting means and said driveline and operative to transmit said other of the two driving power components from said power splitting means to the driveline.

8. A four-wheel drive system as set forth in claim 7, in which said power splitting means comprises a first power transfer gear rotatable with the input member of said differential gear assembly about an axis substantially aligned with the axis of rotation of said power input and output members of said low-and-high speed shift gear assembly and a second power transfer gear held in mesh with the first power transfer gear and rotatable about an axis substantially parallel with the axis of rotation of said first power transfer gear.

9. A four-wheel drive system as set forth in claim 7, further comprising a driveline intervening between said second wheel drive gear unit and said second pair of road wheels and adapted to be driven by the driving power component transmitted to the second wheel drive gear unit through the power splitting gear means, said second wheel-drive gear unit comprising two-wheel/four-wheel drive gear means intervening between said power splitting means and said driveline and operative to selectively provide and interrupt driving connection from the power splitting means to the driveline.

10. A four-wheel drive system as set forth in claim 9, in which said right-angle power transfer means comprises a driving bevel gear rotatable about an axis in a lateral direction of the vehicle, and a driven gear rotatable about an axis in a fore-and-aft direction of the vehicle and held in mesh with said driving bevel gear, said power splitting means being drivingly engageable with said driving bevel gear through said two-wheel/four-wheel drive gear means.

11. A four-wheel drive system as set forth in claim 10, in which said power splitting means comprises a first power transfer gear rotatable with the input member of said differential gear assembly about an axis substantially aligned with the axis of rotation of said power input and output members of said low-and-high speed shift gear assembly, a power transfer gear shaft rotatable about an axis substantially parallel with the axis of rotation of said first power transfer gear, and a second power transfer gear held in mesh with the first power transfer gear and rotatable on said power transfer gear shaft, said second power transfer gear being drivingly engageable with said power transfer gear shaft through said two-wheel/ four-wheel drive gear means and said driving bevel gear being rotatable with said power transfer gear shaft.

12. A four-wheel drive system as set forth in claim 11, in which said two-wheel/four-wheel shift gear means comprises a first clutch member rotatable with said power transfer gear shaft, a second clutch member rotatable with said second power transfer gear on said power transfer gear shaft, and a coupling sleeve axially movable on one of the first and second clutch members selectively into and out of engagement with the other of the first and second clutch members.

* * * * *